Jan. 8, 1924.

C. A. A. RAND

MOWER

Filed May 2, 1919

Inventor:
Charles A. A. Rand,
By Chas. E. Lord
Atty.

Jan. 8, 1924.  1,480,115
C. A. A. RAND
MOWER
Filed May 2, 1919    3 Sheets-Sheet 2
Fig. 2.
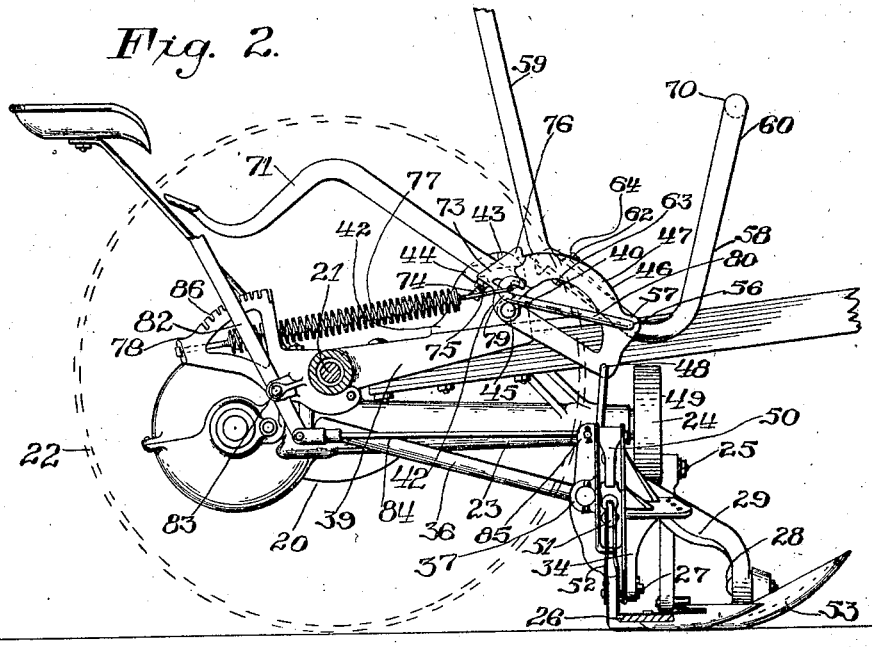
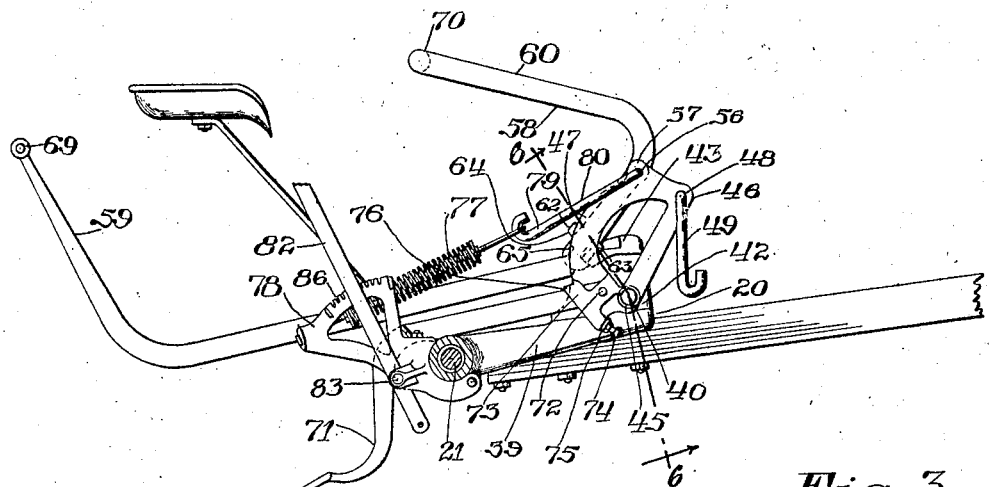
Fig 3.
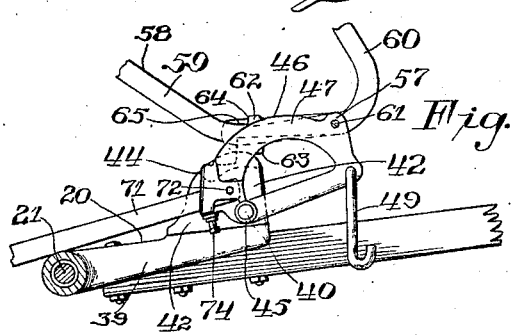
Fig. 4.
Inventor:
Charles A. A. Rand
By Chas. E. Lord,
Atty

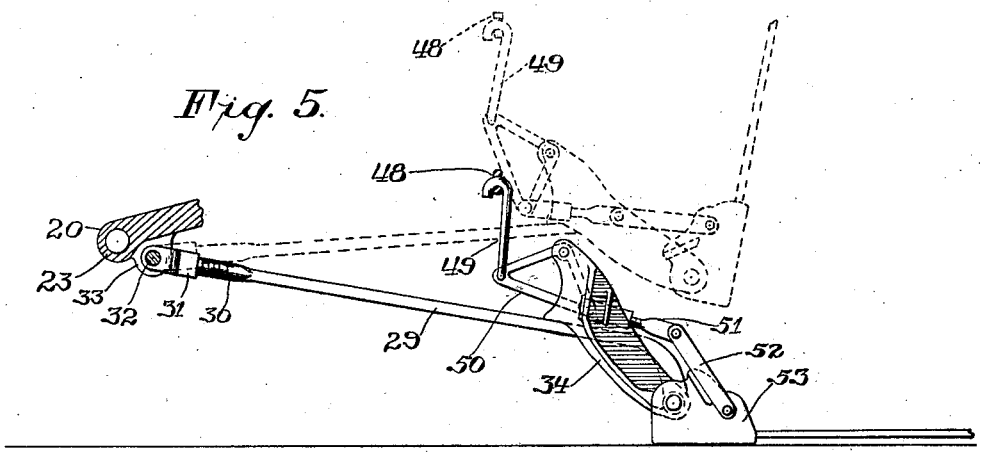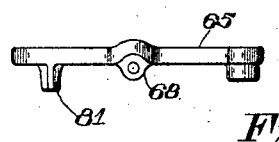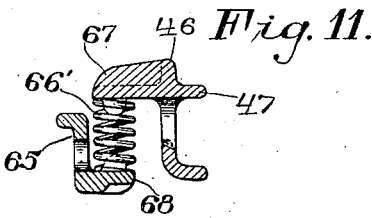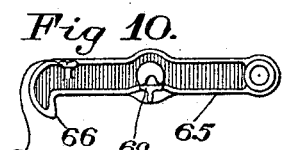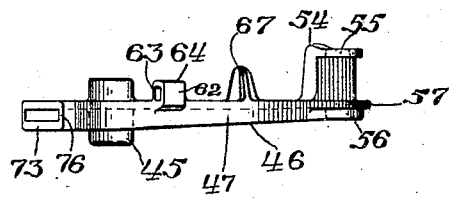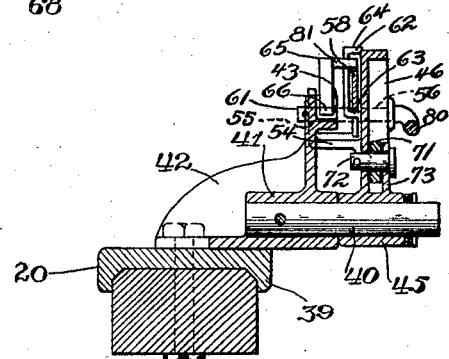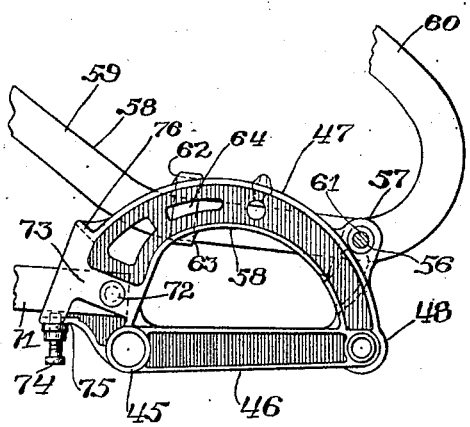

Patented Jan. 8, 1924.

1,480,115

UNITED STATES PATENT OFFICE.

CHARLES A. A. RAND, OF CHICAGO, ILLINOIS, ASSIGNOR TO INTERNATIONAL HARVESTER COMPANY, A CORPORATION OF NEW JERSEY.

MOWER.

Application filed May 2, 1919. Serial No. 294,195.

*To all whom it may concern:*

Be it known that I, CHARLES A. A. RAND, a citizen of the United States, residing at Chicago, in the county of Cook and State of Illinois, have invented certain new and useful Improvements in Mowers, of which the following is a full, clear, and exact specification.

This invention relates to mowing machines, and more particularly to machines for lifting the cutting apparatus and tilting the same to vertical position.

At the present time, and in the near future, both in the United States and in other countries, the operators of farm implements will, many of them, be handicapped by the loss of an arm or a leg; for this reason implements, such as mowing machines, should be so designed and constructed that the essential adjustments can be made by an operator even though he be handicapped in the manner above described.

The present invention has for its object, therefore, to provide a mowing machine in which the essential adjustments and the controlling levers for making the adjustments, may be operated by either the hand or the foot of the operator.

More specifically stated, the invention has for its object to so construct and arrange the levers on a mowing machine and to so connect them to the parts to be adjusted thereby, that the levers may be controlled by either the hand or the foot, and may be adjusted with a minimum expenditure of force on the part of the operator.

A further object is to provide a construction of lifting mechanism in which the weight of the elements to be lifted is very largely counterbalanced by suitable counterbalancing means after a slight initial movement of the lifting mechanism, thereby minimizing the force required to manipulate the lifting mechanism.

A still further object is to so arrange and locate the controlling mechanism that is will be within easy reach of the operator at all times and will be located in such a position that it may be operated by hand or by foot, as desired.

With these and other objects in view, the invention consists, briefly, in controlling means such as levers, so mounted on a mowing machine and so constructed as to be operable by either hand or foot, and, moreover, a construction in which the counterbalancing means is so connected with the controlling means that it will be brought into action after a slight initial movement of the controlling means.

I have illustrated in the accompanying drawings one embodiment of my invention, and in these drawings,—

Fig. 2 is a side elevation of the construction shown along line 2—2 in Fig. 1, the cutting apparatus being shown in its operative position;

Fig. 3 is a side elevational view similar to Fig. 2 but showing the lifting levers in the position taken after they have been manipulated to lift the cutting apparatus to vertical position;

Fig. 4 is a view in side elevation, similar to Fig. 3, but showing the lifting levers in the position taken after the cutting apparatus has been lifted to plain lift position;

Fig. 5 is a rear elevational view, partly in section, taken along line 5—5 of the construction shown in Fig. 1;

Fig. 6 is a sectional view of the improved lifting mechanism, showing this mechanism in the position shown in Fig. 3, and taken along line 6—6 in said figure looking in the direction of the arrows;

Fig. 7 is an enlarged detail view of the lifting mechanism;

Fig. 8 is an enlarged detail view showing in plan the lever which carries the hand levers and foot levers;

Figs. 9 and 10 illustrate respectively, in plan and side elevation, the construction of the locking pawl;

Fig. 11 is a sectional view taken along line 11—11 of Fig. 1 showing in enlarged detail the locking pawl and lever which carries the pawl.

Figure 1:
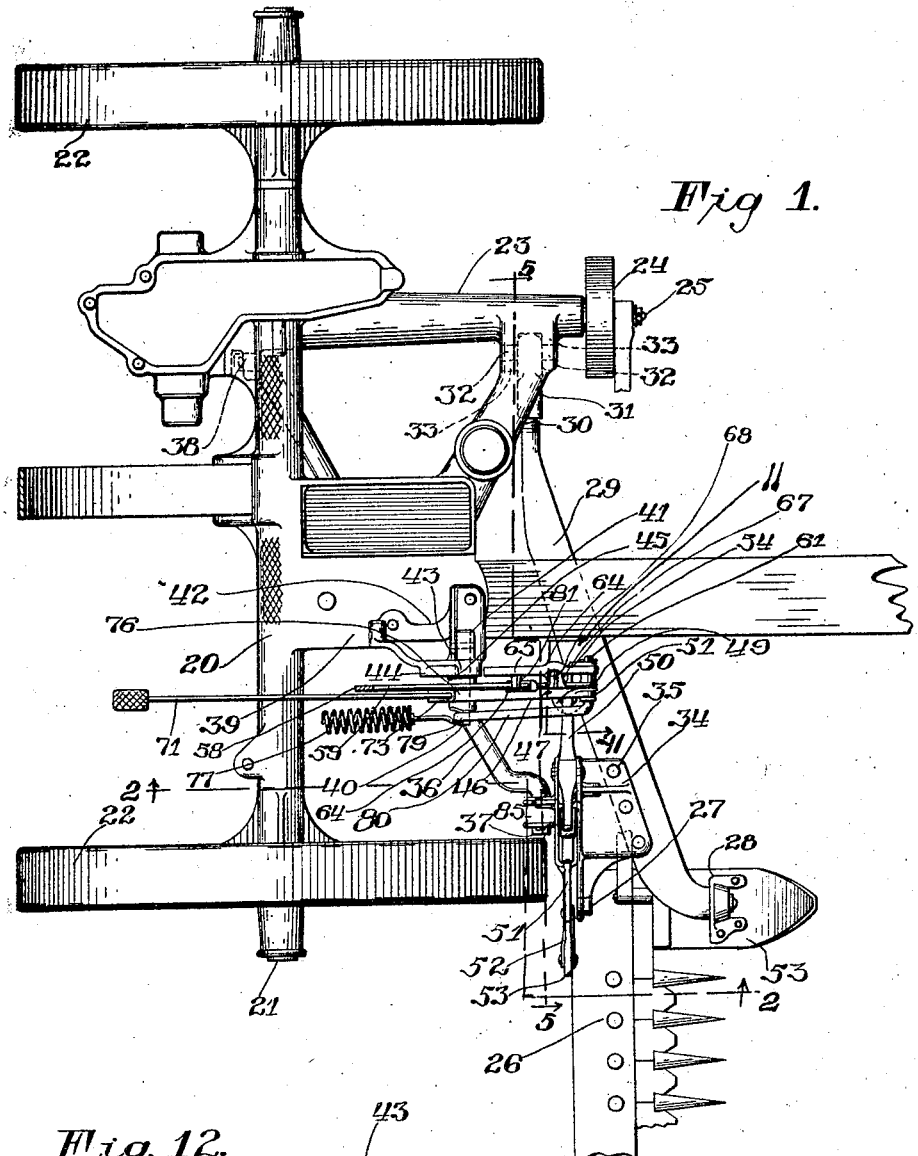
Figure 1 is a top plan view of the mowing machine with my improved lifting mechanism thereon.
Figure 12:
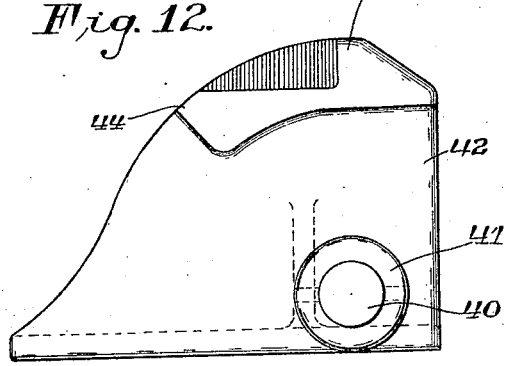
Fig. 12 is an enlarged detail view showing in side elevation the construction of the notched sector with which the locking pawl cooperates to hold the lifting mechanism in adjusted position.

The frame 20 of the mowing machine is carried in the usual manner on the axle 21 and is supported by wheels 22. The machine frame has formed integrally therewith a forwardly extending shaft casing 23 through which extends the usual drive shaft for the cutting apparatus, carrying at its front end a flywheel 24 which in turn carries a forwardly projecting crank pin 25. The pin 25 is connected to the cutting apparatus by the usual pitman connection (not shown).

The cutting apparatus 26 is in the present instance pivotally supported at 27 and 28 on the grassward end of the coupling frame 29, having a stubbleward end 30 adjustably secured by a screw threaded connection to a bracket 31 pivoted at 32 to ears 33 carried by the casting 23. The pivotal support 27 above referred to, is carried by a bracket 34 secured to the grassward end of the coupling frame, 29. This bracket 34 is also braced on the machine frame by the usual brace bar 36 which is pivoted at 37 to the bracket 34 and at 38 to the frame 20.

The lifting mechanism for the cutting apparatus is secured to a forwardly projecting portion 39 of the machine frame, this lifting mechanism being supported on a pivot pin 40 which is secured to a sleeve 41 formed integral with a bracket 42 carried by the portion 39 of the frame. The bracket 42 in addition to forming the support for the pivot pin which carries the lifting levers, has also formed thereon upwardly projecting teeth 43 and 44, these teeth cooperating in a manner hereinafter described, with the lever locking mechanism to hold the lever mechanism in adjusted position.

The pivot pin 40 above described has pivotally mounted thereon a sleeve 45 formed integral with a lifting member 46, this lifting member acting as a lever and being manipulated in a manner more fully hereinafter described. This member is formed substantially straight on one side, or on its lower side, and has a substantially semi-circular formation shown at 47, on its upper side. At its front end the member 46 is provided with an eye 48 through which passes the upper hooked end of a link 49 as shown particularly in Fig. 5. The link 49 is pivotally connected at its lower end to a gag member 50 which has pivotally secured to its opposite end a link 51. The link 51 which is pivoted to the lower end of the gag member 50, is connected at its opposite end by means of a link 52 to shoe 53 carried at the stubbleward end of the cutting apparatus.

From the above description it will be seen, therefore, that the lifting member or lever 46 is operatively connected to the cutting apparatus, these operative connections not being claimed per se, since they are not in themselves novel.

The upper portion 47 of the lifting member 46 is provided as shown in Fig. 8 with an offset lug 54 having an aperture 55 disposed in alinement with an aperture 56 formed in a forwardly projecting lug 57, also formed on the portion 47 of the lifting member. An operating lever 58 having two upwardly extending arms 59 and 60 is pivotally mounted on a pin 61 which is secured in the alined apertures 55 and 56 formed in the lugs 54 and 57. The movement of the lever 58 on its pivot 61 is limited by the upper and lower walls 62 and 63, respectively, of an offset guiding portion 64, formed on the side of the upper portion 47 of the lifting member 46, this guiding portion 64 enclosing the lifting lever 58 as clearly shown in Figs. 6 and 7.

The pivot pin 61 above described, in addition to carrying the lever 58, also pivotally carries a pawl 65 having a tooth 66 at its rear end adapted to engage with the teeth 43 and 44 in the bracket, 42. Means is provided for normally forcing this pawl in a downward direction, this means comprising a spring 66′ which is positioned between an offset lug 67 formed on the portion 47 of the lifting member 46, and an offset lug 68 which projects laterally from the pawl 65, this construction being shown in detail in Fig. 11. The arm 59 of the lever 58 is provided at its free end with a handle 69 which may be grasped by the operator, and the arm 60 is also provided with a handle 70 which may be grasped by the hand of the operator, or may be engaged by the foot of the operator, as desired. The foot lever 71 is also pivoted to the lifting lever 46 on a pivot pin 72 which passes through alined apertures formed in the lifting member 46 and in an offset portion 73. Movement of the lever 71 about its pivot is limited in the downward direction by an adjustable screw 74 which is threaded into a rearwardly extending lug 75 formed on the member 46, and in an upward direction by the wall 76 which connects the offset portion 73 with the main portion of the lifting member 46.

In order to assist the operator in raising the cutting apparatus, counterbalancing means is provided, this means comprising a spring 77 adjustably secured at its rear end to a sector bracket 78 and at its front end secured to rear end 79 of a link 80, the front end of which is formed integral with, or secured to, the pivot pin 61 before described.

As shown in Fig. 2, the lifting force of the spring 77 is normally substantially inoperative, since the link 80 engages the outer end of the pivot pin 40 which carries the lifting lever 46. However, as soon as one of the lifting levers has been actuated to raise the pivot pin 61 or the pivotal connection between the link 80 and the member 46 above a line passing through the rear end of the spring and the pivot pin 40, the lifting force of the spring comes into action and counterbalances the weight of the cutting apparatus, thereby assisting the operator in raising the cutting apparatus. The lifting lever 58 when moved in a clockwise direction about its pivot, operates as a releasing member for the pawl 65 since the pawl 65 has integrally formed thereon an offset lug 81 which is positioned over the lever 58. Therefore, as the lever 58 is swung about its pivot, there is sufficient movement of this lever to cause the pawl 65 to be released from the teeth 43 or 44 in the bracket 42.

The usual tilting mechanism for the cutting apparatus is provided and comprises a lever 82 pivoted at 83 to the mower frame and connected at its lower end by means of a link 84 to the upper end 85 of the bracket 34 hereinbefore described. The lever 82 is provided in the usual manner with a pawl (not shown) which cooperates with the notches 86 formed on the upper edge of the sector 78 to hold the lever in any desired position of adjustment.

It is usually found desirable to adjust the foot lever 71 by means of the screw 74 to a position in which the rear end of the foot lever will engage the frame 20 of the mower prior to the engagement of tooth 43 by the pawl 65, since with the lever adjusted in this position, the operator may raise the cutting apparatus to plain lift position and lower it again to operative position without the necessity of releasing the pawl from the teeth in the bracket 42.

Having described the construction of my improved lifting mechanism, the various methods of operating this mechanism will be briefly set forth.

Assuming, in the first place, that the operator is handicapped by the loss of his arms and therefore must make the adjustments entirely by means of his feet, if it is desired to lift the cutting apparatus to plain lift position, to pass over some obstacle in the path of the mower, this may be accomplished by merely pressing downward on the foot lever 71, a slight downward pressure being sufficient to lift the cutting apparatus to plain lift position. After the obstacle has been passed the operator releases the foot lever and the cutting apparatus will return to normal operative position.

Assuming, as in the first instance, that the operator is handicapped by the loss of his arms, but in this case that he desires to lift the cutting apparatus to vertical lift position, this may be done by pressing downward on the foot lever 71 with a strong abrupt pressure. If the foot lever 71 which is pivoted to the lifting mechanism is forced downwardly in this manner, until it strikes the frame 20 of the mower, the momentum imparted to the lifting mechanism together with the lifting force exerted by the counterbalancing spring 77 will cause the cutting apparatus to be swung into vertical lift position, in which position the pawl 65 will engage the tooth 44 and retain the apparatus in vertical position. In order to release the cutting apparatus, the operator will engage with his foot the handle 70 carried by the arm 60 of the lever 58, and press forwardly on this handle thereby swinging the lever 58 about its pivot causing the pawl 65 to be released from the tooth 44 and the weight of the cutting apparatus will cause it to return to normal or operative position.

Assuming, for another example, that the operator is handicapped by the loss of his feet, but desires to lift the cutting apparatus to plain or vertical position,—to lift the apparatus to plain lift position the operator will grasp the handle 69 of the rearwardly extending portion of the lever 58 and will pull rearwardly on this handle until the cutting apparatus has reached a sufficient height to pass over the obstacle in the path thereof. In order to lift the apparatus to vertical position, a stronger force on the handle 69 will be exerted, and this force aided by the spring 77 will cause the apparatus to swing to vertical position. The return movement of the cutting apparatus is accomplished as in the manner above set forth, but in this case the handle 70 carried by the arm 60 of the lever 58 or the handle 69, will be engaged by the hand of the operator instead of by the foot.

There are various other methods of operating the lifting mechanism which will doubtless occur to the operator as he performs the various adjustments. For instance, the portion of the arm 59 adjacent the lifting member is so constructed and arranged that it may be engaged by the foot of the operator when the lifting member has been actuated to raise the cutting apparatus to plain lift position, and therefore the arm 59 may be actuated by the operator's foot to raise the cutting apparatus from plain to vertical lift position.

In all of the methods above described, the counterbalancing spring comes into action after a slight initial movement of the lifting lever 46, and may be adjusted to exert any desired counterbalancing force, thereby enabling the operator to lift the cutting apparatus with a minimum expenditure of force.

From the above description of the construction and operation of my improved lifting mechanism, it will be seen that a simple and efficient construction has been provided, and a construction so constructed and arranged that the lifting may be performed by the hands or the feet of the operator, and the releasing of the cutting apparatus may likewise be performed by hand or foot. The lifting levers, by means of which the cutting apparatus is raised and lowered, are moreover, arranged in such a manner that they are always easily accessible and may be manipulated by an operator who is handicapped by the loss of arms or legs.

Although, in the above specification, I have described but one embodiment of my invention, it will be readily understood that the invention is capable of modification, and that modifications and changes may be made without departing from the spirit and scope of the invention as expressed in the following claims.

1. In a mower, a frame, cutting apparatus carried thereby, lifting mechanism carried by said frame and operatively connected to said cutting apparatus, said lifting mechanism comprising a lifting member pivoted on said frame, operative connections between said lifting member and said cutting apparatus, a lifting lever carried by said lifting member and having a plurality of upwardly extending portions and means for adjusting said cutting apparatus by manipulating any of said portions.

2. In a mower, a frame, cutting apparatus carried thereby, lifting mechanism carried by said frame and operatively connected to said cutting apparatus, said lifting mechanism comprising a lifting member pivoted on said frame, means pivotally mounted on said member for locking said cutting apparatus in predetermined positions of adjustment, and means mounted on the pivot of said first named means for controlling said first named means.

3. In a mower, a frame, cutting apparatus carried thereby, lifting mechanism carried by said frame and operatively connected to said cutting apparatus, said lifting mechanism comprising a lifting member, means carried by said member for locking said cutting apparatus in predetermined positions, and means carried by said member for unlocking said first mentioned means.

4. In a mower, a frame, cutting apparatus carried thereby, lifting mechanism operatively connected to said cutting apparatus and comprising a lifting member pivoted on said frame, operative connections between said lifting member and said cutting apparatus, a lifting lever pivoted on said lifting member and limited in its movement with respect thereto, and means on the pivot of said lever for locking said cutting apparatus in predetermined positions.

5. In a mower, a frame, cutting apparatus carried thereby, lifting mechanism for said cutting apparatus comprising a lifting member pivoted to said frame, operative connections between said lifting member and said cutting apparatus, a notched sector carried by said frame, a pawl pivoted to said lifting member and adapted to engage said notched sector, and a lifting lever for manipulating said lifting member and having a portion disposed in the path of movement of said pawl and adapted to release said pawl from locking engagement with said notched sector as said lifting lever is moved in a predetermined direction about its pivot.

6. In a mower, a frame, cutting apparatus carried thereby, a lifting member pivoted to said frame, operative connections between said lifting member and said cutting apparatus, a pawl pivoted to said lifting member, means for normally pressing said pawl in a downward direction, a notched sector carried by said frame and disposed in the path of movement of said pawl, and a lifting lever having a plurality of upwardly extending arms and having a portion disposed in the path of movement of said pawl and adapted to lift said pawl out of engagement with said notched sector as said lifting lever is moved in a predetermined direction about its pivot.

7. In a mower, a frame, cutting apparatus carried thereby, lifting mechanism for said cutting apparatus comprising a lifting member, a foot lever adjustably carried by said lifting member and extending rearwardly therefrom, a hand lever having a plurality of upwardly extending arms pivotally connected to said lifting member, a counterbalancing spring operatively connected between said frame and said lifting member and means for adjusting said cutting apparatus by any one of said arms.

8. In a mower, a frame, cutting apparatus carried thereby, a lifting member pivoted to said frame, operative connections between said lifting member and said cutting apparatus, a notched sector carried by said frame, a pawl pivoted on said lifting member and adapted to engage said notched sector, and a lifting lever pivoted on said lifting member and having upwardly extending arms, said lifting lever having a portion disposed in the path of movement of said pawl and adapted to release said pawl from said notched sector.

9. In a mower, a frame, a seat carried thereby, cutting apparatus carried by said frame, lifting mechanism for said cutting apparatus comprising a lifting member, operative connections between said lifting member and said cutting apparatus, and a lifting lever pivoted to said lifting member and having a plurality of upwardly extending arms whereby at least one arm extends forwardly of said seat in all positions of adjustment of the cutting apparatus.

10. In a mower, a frame, a seat carried thereby, cutting apparatus carried by said frame, a notched sector carried by said frame, a lifting member pivoted on said sector operatively connected to said cutting apparatus, and a lever carried by said lifting member and having a plurality of upwardly extending arms diverging from said lifting member and positioned at different distances from said seat.

11. In a mower, a frame, a seat carried thereby, cutting apparatus carried by said frame, lifting mechanism for said cutting apparatus including a lifting lever having a plurality of upwardly extending arms, one of said arms being normally located in a position to be engaged by the hand of the operator when said cutting apparatus is in operative position, and another of said arms being located in a position to be engaged by the operator when said cutting apparatus has been lifted.

In testimony whereof I affix my signature.

CHARLES A. A. RAND.